United States Patent [19]

McClellan

[11] Patent Number: 5,181,052
[45] Date of Patent: Jan. 19, 1993

[54] EYEGLASS RETAINER

[76] Inventor: Bingham A. McClellan, 43 Forest La., Eustis, Fla. 32726

[21] Appl. No.: 650,099

[22] Filed: Feb. 4, 1991

[51] Int. Cl.⁵ .................................................. G02C 3/00
[52] U.S. Cl. ...................................... 351/156; 351/157
[58] Field of Search ........................ 351/157, 156, 123; 24/3 C; 2/452

[56] References Cited

U.S. PATENT DOCUMENTS

| | | | |
|---|---|---|---|
| 2,704,961 | 3/1955 | Weil | 351/157 |
| 3,588,960 | 6/1971 | McClellan et al. | 24/3 |
| 4,974,956 | 12/1990 | Gill | 351/157 |

OTHER PUBLICATIONS

Snugger Advertisement, 1987, Burke Fishing Lures Catalogue.

Primary Examiner—Rodney B. Bovernick
Attorney, Agent, or Firm—Charles M. Kaplan

[57] ABSTRACT

An eyeglass retainer for holding eyeglasses snugly and comfortably on the head of an active wearer has a coil of attractively colored separable loops that expands and is temporarily universally deformable so it can adjust to fit the wearer's head. Resilient connectors that surround the terminal ends of the coil may removably couple the coil to eyeglass stems. The retainer may also be used as an attractive fashion accessory.

7 Claims, 1 Drawing Sheet

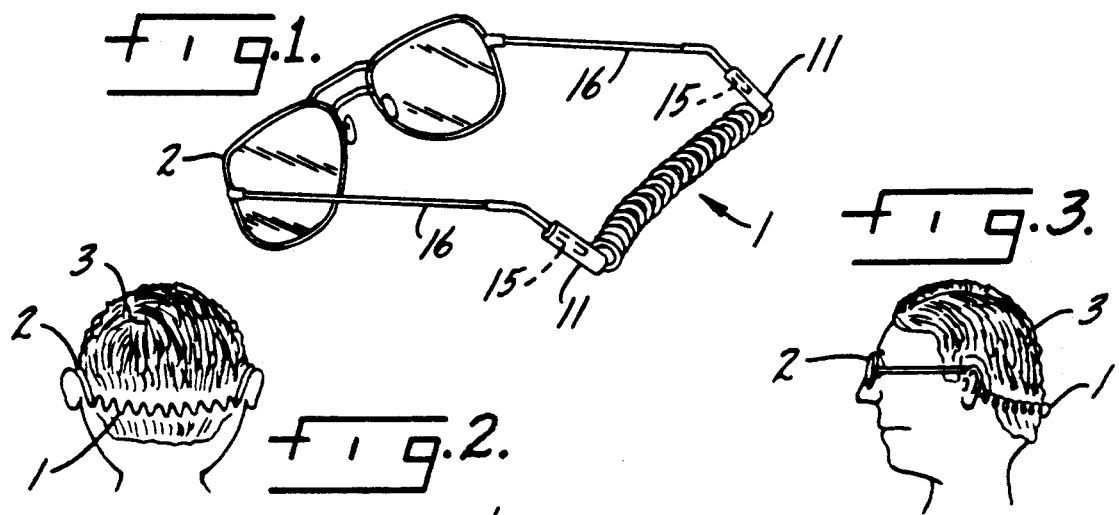
Fig. 1.
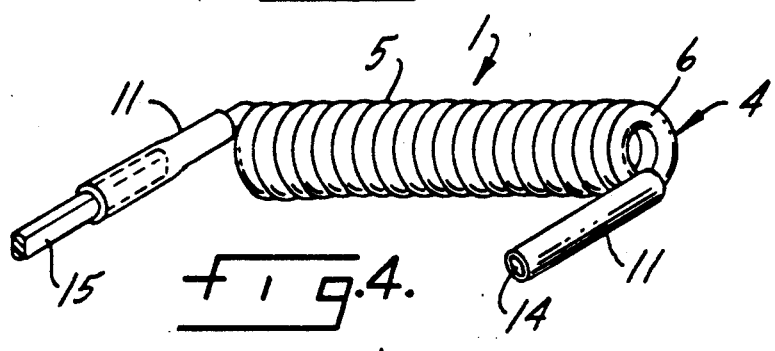
Fig. 2. Fig. 3.
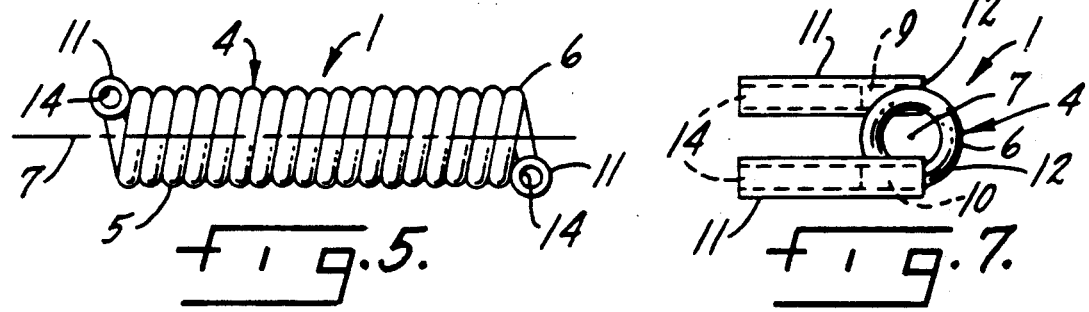
Fig. 4.
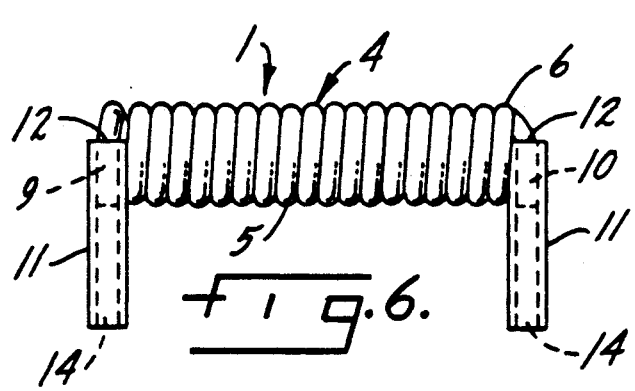 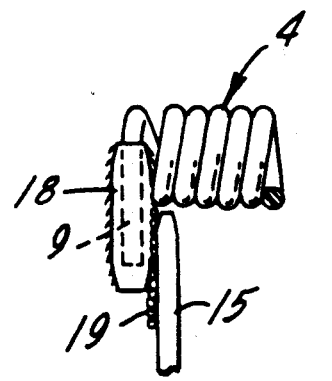
Fig. 5. Fig. 7.
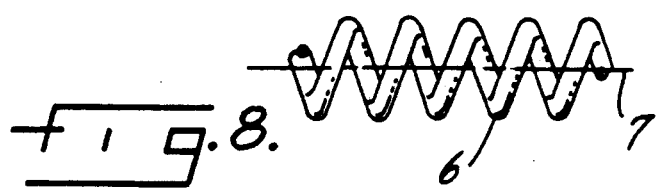 
Fig. 6. Fig. 8. Fig. 9.

EYEGLASS RETAINER

BACKGROUND OF THE INVENTION

This invention relates to eyeglass retainers or holders. Eyeglass wearers who engage in sports and other vigorous activities need relatively strong eyeglass retainers that securely hold their eyeglasses on their heads. Prior retainers often have been uncomfortable to wear when they were tight enough to prevent eyeglasses from slipping. Also, their unattractiveness often induced eyeglass wearers to remove the retainers from their glasses when they were not physically active.

OBJECTIVES OF THE INVENTION

Accordingly, it is an object of this invention to provide an improved retainer for holding eyeglasses on the wearer's head.

Another object is to provide an automatically expandable eyeglass retainer that will fit many head sizes without having to be adjusted.

Another object is to provide an eyeglass retainer that is comfortable to wear even though it holds eyeglasses snuggly on a wearer's head.

Another object is to provide an eyeglass retainer that will not become tangled in the wearers hair or clothing.

Another object is to provide an eyeglass retainer that can be made from differently colored components and can also serve as an attractive conspicuous fashion accessory.

Another object is to provide an eyeglass retainer that will hold eyeglasses in different locations on a wearer's head without requiring adjustment.

Another object is to provide a stretchable eyeglass retainer that is attractive, comfortable to wear, easy to manufacture, durable, relatively inexpensive, and which does not possess defects found in similar prior art retainers.

Other objects and advantages of the invention will be revealed in the specification and claims, and the scope of the invention will be set forth in the claims.

DESCRIPTION OF THE DRAWING

FIG. 1 is a perspective view of an embodiment of the invention.

FIG. 2 is a rear view of a person wearing the invention.

FIG. 3 is a side view of a person wearing the invention.

FIG. 4 is an enlarged perspective view of the invention.

FIG. 5 is a side view of the invention.

FIG. 6 is a top view of the invention.

FIG. 7 is an end view of the invention.

FIG. 8 is a partial top view showing coils separated.

FIG. 9 is a fragmentary top view of another embodiment of the invention.

DESCRIPTION OF THE INVENTION

The drawing shows a retainer 1 for holding eyeglasses 2 on the head 3 of a wearer. Retainer 1 has a stretchable or expandable member 4 made from an integral length of resilient flexible translucent synthetic plastic material, such as polyvinylchloride. Such material is wound into a coil 5 composed of substantially identical contiguous circular loops 6 aligned along a common central axis 7. Coil 5 may have terminal ends 9 and 10 that face generally in the same direction that is essentially perpendicular to axis 7. One end 9 extends from an edge of coil 5 above axis 7 and the other end 10 extends from an edge of coil 5 below axis 7. The material from which member 4 is made should be a relatively large extruded circular strand having an exterior diameter in the range of about 1/16 to about ⅛ inch. The diameter of the circular loops into which the material from which member 4 is coiled should be relatively large and in the range of about 1 54 to about 2 inches.

Retainer 1 includes a pair of essentially identical eyeglass stem connectors 11 for coupling member 4 to eyeglasses 1. Each connector 11 should be made from a relatively short length of resilient flexible material such as latex surgical tubing having an interior diameter of 5/32 inch and an exterior diameter of ¼ inch. Larger or smaller tubing may be used to conform to the size of coil 5. Connectors 11 are right circular cylindrical tubes having open ends 12 and 14. One terminal end 9 or 10 of member 4 extends into one open end 12 of and is completely surrounded by a connector 11, and the other terminal end of member 4 extends into one open end 12 and is completely surrounded by the other connector 11, as shown in phantom in FIGS. 6 and 7. Ends 9 and 10 should be bonded into connectors 11 by a suitable adhesive, such as Duro Quick Gel brand cyanoacrylate ester. The opposite end 14 of each connector 11 is adapted to receive and completely surround a terminal end 15 of an eyeglass stem 16. The diameter of the opening in end 14 and the thickness and resiliency of the tubular material from which connectors 11 are made should be predetermined such that connectors 11 grip stem terminal ends 15 with sufficient frictional engagement alone to hold retainer 1 on eyeglasses 2 during vigorous activity of the wearer.

FIG. 9 shows another embodiment in which member 4 is coupled to eyeglass stems 16 by adhesive-backed hook and loop connectors 18 and 19 of the type identified by the trademark Velcro. A hook or loop connector 18 is wrapped completely around and surrounds each of the terminal ends 9 and 10 of member 4. The adhesive backing bonds connectors 18 to terminal ends 9 and 10. A mating hook or loop connector 19 is bonded to the outside of the ends 15 of the stems 16.

The length of coil 5 should be in the range of about 2 to 3 inches so that when retainer 1 is in use, loops 6 separate along central axis 7 so as to expand the coil, as shown in FIG. 8. This enables coil 5 to act as a spring that automatically adjusts to the size of the head of the wearer. The resiliency of the material and the size of the strand from which member 4 is made should be predetermined so that coil 5 will not be permanently deformed during normal use. This enables coil 5 to return essentially to its original configuration with the loops 6 contiguous after retainer 1 has been removed from eyeglasses 2. The relatively large loops 6 of coil 5 contact the back of the wearer's head or neck and snugly hold eyeglasses 2 on the wearer's head without causing discomfort. The relatively large diameter of the strand of material from which coil 5 is made and the relatively large size of loops 6 prevent coil 5 from becoming entangled with the wearer's hair. If retainer 1 is to be used by wearers having exceptionally large or small heads (e.g. young children), the length of coil 5 should be altered accordingly. Coil 5 is temporarily universally deformable so that retainer 1 can stretch around and fit heads of different sizes and shapes. Retainer 1 can be used to hold eyeglasses on a wearer's nose as shown in FIGS. 2 and 3, or on a wearer's forehead or neck. The appeal of retainer 1 may be enhanced by making member 4 and connectors 11 or 18 and 19 from different colors that match the colors of a school or organization of the wearer. Since retainer 1 can be easily and quickly removed from eyeglass stems 16 simply by pulling the stems and connectors 11 or 18 and 19 apart, retainers of different colors may be changed to match the colors of the wearer's clothing. The large size of the strand from which coil 5 is made and the large diameter of the coil enable retainer 1 to serve as an attractive fashion accessory.

While the invention has been described with reference to a particular embodiment, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. An eyeglass retainer comprising:
   A. an integral resilient flexible circular member having a uniform exterior diameter, said member being wound into a coil of substantially identical circular loops aligned along a common central axis, each of said loops touching its adjacent loop or loops continuously over its entire extent when said coil is unexpanded by an eyeglass wearer, said member having cylindrical terminal ends that extend essentially perpendicularly to said central axis, said loops being separable along said central axis so as to expand said coil, said coil being universally deformable so that said eyeglass retainer can stretch around a head of an eyeglass wearer and snugly hold such eyeglasses on such head, and said coil having a resiliency that prevents said coil from being permanently deformed during normal use and causes said coil to return to its original configuration with each of said loops touching its adjacent loop or loops continuously over its entire extent when said retainer is removed from said eyeglasses;
   B. a pair of eyeglass stem connectors, each comprising a resilient flexible right circular cylindrical tube having a uniform interior diameter, each tube being open at its opposite ends so as to provide a pair of identical circular holes of the same diameter at its opposite ends; and
   C. each of said cylindrical terminal ends of said members extending into one of said identical circular holes in one of said cylindrical tubes, each of said tubes completely surrounding and being bonded to the terminal end it receives, and the other of said pair of identical circular holes being adapted to receive a terminal end of an eyeglass stem and to attach said eyeglass retainer to such terminal end by frictional contact therewith.

2. The invention defined in claim 1, wherein said terminal ends of said strand both face in generally the same direction.

3. The invention defined in claim 1, wherein one of said terminal ends extends from an edge of said coil above said central axis, and the other of said terminal ends extends from an edge of said coil below said central axis.

4. The invention defined in claim 1, wherein said terminal ends of said strand both face in generally the same direction, and one of said terminal ends extends from an edge of said coil above said central axis, and the other of said terminal ends extends from an edge of said coil below said central axis.

5. The invention defined in claim 1, wherein said member has an exterior diameter in the range of about 1/16 to about ½ inch, said circular loops into which said member is coiled have a diameter in the range of about ⅜ to about 2 inches, and the length of said coil is about 2 to about 3 inches.

6. The combination comprising:
   A. a pair of eyeglasses having a pair of stems, each stem having a terminal end; and
   B. an eyeglass retainer for holding said eyeglass snuggly on the head of an eyeglass wearer, comprising:
      1. an integral resilient flexible circular member having a uniform exterior diameter, said member being wound into a coil of substantially identical circular loops aligned along a common central axis, each of said loops touching its adjacent loop or loops continuously over its entire extent when said coil is unexpanded by an eyeglass wearer, said member having cylindrical terminal ends that face generally in the same direction and extend essentially perpendicularly to said central axis, one of said terminal ends extending from an edge of said coil above said central axis, and the other of said terminal ends extending from an edge of said coil below said central axis, said loops being separable along said central axis so as to expand said coil, said coil being universally deformable so that said eyeglass retainer can stretch around a head of an eyeglass wearer and snugly hold such eyeglasses on such head, and said coil having a resiliency that prevents said coil from being permanently deformed during normal use and causes said coil to return to its original configuration with each of said loops touching its adjacent loop or loops continuously over its entire extent when said retainer is removed from said eyeglasses;
      2. a pair of eyeglass stem connectors, each comprising a resilient flexible right circular cylindrical tube having a uniform interior diameter, each tube being open at its opposite ends so as to provide a pair of identical circular holes of the same diameter at the opposite ends of each of said connectors; and
      3. each of said cylindrical terminal ends of said member extending into one of said identical circular holes in one of said cylindrical tubes, each of said tubes completely surrounding and being bonded to the terminal end it receives, and the other of said pair of identical circular holes being adapted to receive a terminal end of an eyeglass stem and to attach said eyeglass retainer to such terminal end by frictional contact therewith.

7. The invention defined in claim 6, wherein said member has an exterior diameter in the range of about 1/16 to about ½ inch, said circular loops into which said member is coiled have a diameter in the range of about ⅜ to about 2 inches, and the length of said coil is about 2 to about 3 inches.

* * * * *

UNITED STATES PATENT AND TRADEMARK OFFICE
CERTIFICATE OF CORRECTION

PATENT NO. : 5,181,052
DATED : January 19, 1993
INVENTOR(S) : Bingham A. McClellan It is certified that error appears in the above-indentified patent and that said Letters Patent is hereby corrected as shown below:

Column 2 line 9 "154" should be --3/8--.

Signed and Sealed this

Second Day of November, 1993

Attest:

BRUCE LEHMAN

Attesting Officer

Commissioner of Patents and Trademarks